United States Patent
Otsuka et al.

(10) Patent No.: US 12,421,382 B2
(45) Date of Patent: Sep. 23, 2025

(54) VEHICLE COMPOSITION FOR INORGANIC FINE PARTICLE DISPERSION, INORGANIC FINE PARTICLE-DISPERSED SLURRY COMPOSITION AND METHOD FOR PRODUCING INORGANIC FINE PARTICLE-DISPERSED SHEET

(71) Applicant: SEKISUI CHEMICAL CO., LTD., Osaka (JP)

(72) Inventors: Jo Otsuka, Yamaguchi (JP); Tatsuya Matsukubo, Yamaguchi (JP); Kenji Yamauchi, Osaka (JP); Yasuko Ishida, Yamaguchi (JP)

(73) Assignee: SEKISUI CHEMICAL CO., LTD., Osaka (JP)

( * ) Notice: Subject to any disclaimer, the term of this patent is extended or adjusted under 35 U.S.C. 154(b) by 882 days.

(21) Appl. No.: 17/270,217

(22) PCT Filed: Aug. 21, 2019

(86) PCT No.: PCT/JP2019/032530
§ 371 (c)(1),
(2) Date: Feb. 22, 2021

(87) PCT Pub. No.: WO2020/045174
PCT Pub. Date: Mar. 5, 2020

(65) Prior Publication Data
US 2021/0317296 A1    Oct. 14, 2021

(30) Foreign Application Priority Data

Aug. 30, 2018 (JP) .................. 2018-161762
Feb. 28, 2019 (JP) .................. 2019-036302
Jun. 14, 2019 (JP) .................. 2019-111069

(51) Int. Cl.
C08L 33/10    (2006.01)
C08K 3/013    (2018.01)
C08K 5/00    (2006.01)

(52) U.S. Cl.
CPC .............. *C08L 33/10* (2013.01); *C08K 3/013* (2018.01); *C08K 5/0016* (2013.01)

(58) Field of Classification Search
CPC ....... C08L 33/10; C08K 3/013; C08K 5/0016; C08K 3/24; C08K 5/11; C08K 5/08; C08K 5/13; C08K 5/18; C08F 220/1802; C08F 220/1811; C08F 220/1808; C08F 220/1804; C08F 220/14; C08F 220/325; C08F 220/1818; C08J 5/18
See application file for complete search history.

(56) References Cited

U.S. PATENT DOCUMENTS

| | | | |
|---|---|---|---|
| 2010/0171412 A1* | 7/2010 | Tanaka | H01J 9/02 |
| | | | 252/301.36 |
| 2010/0222462 A1 | 9/2010 | Yamauchi et al. | |
| 2013/0203952 A1 | 8/2013 | Fujiyama et al. | |
| 2016/0053039 A1 | 2/2016 | Mikayama et al. | |
| 2018/0339947 A1 | 11/2018 | Nagai | |
| 2019/0194507 A1 | 6/2019 | Chiba et al. | |

FOREIGN PATENT DOCUMENTS

| | | | | |
|---|---|---|---|---|
| CN | 1817942 | | 8/2006 | |
| CN | 102333818 | | 1/2012 | |
| JP | 2001-278638 | | 10/2001 | |
| JP | 2007-073977 | | 3/2007 | |
| JP | 2007-197312 | | 8/2007 | |
| JP | 2007197312 A | * | 8/2007 | |
| JP | 2009-263188 | | 11/2009 | |
| JP | 2010-117614 | | 5/2010 | |
| JP | 6187810 | | 8/2017 | |
| TW | 201107389 | | 3/2011 | |
| TW | 201107389 A | * | 3/2011 | ............ C03C 8/16 |
| TW | 201437183 | | 10/2014 | |
| TW | 201734124 | | 10/2017 | |
| WO | 2009/031663 | | 3/2009 | |
| WO | 2012/029849 | | 3/2012 | |
| WO | 2018/043624 | | 3/2018 | |

OTHER PUBLICATIONS

International Search Report issued Oct. 29, 2019 in International (PCT) Patent Application No. PCT/JP2019/032530.

* cited by examiner

*Primary Examiner* — K. Boyle
(74) *Attorney, Agent, or Firm* — Wenderoth, Lind & Ponack, L.L.P.

(57) ABSTRACT

The present invention aims to provide a vehicle composition for inorganic fine particle dispersion which has excellent decomposability at low temperature and enables degreasing in a short time, an inorganic fine particle-dispersed slurry composition containing the vehicle composition for inorganic fine particle dispersion, and a method for producing an inorganic fine particle-dispersed sheet with the inorganic fine particle-dispersed slurry composition. The present invention relates to a vehicle composition for inorganic fine particle dispersion, containing a binder resin, an organic solvent, and an organic compound having a boiling point at normal pressure of 200° C. or higher and lower than 400° C., the binder resin containing a (meth)acrylic resin, the organic compound containing at least one selected from a phenol compound, an aromatic amine compound, a quinone compound, and a nitro compound, the amount of the organic compound being 1 to 100 parts by weight relative to 100 parts by weight of the binder resin.

6 Claims, No Drawings

VEHICLE COMPOSITION FOR INORGANIC FINE PARTICLE DISPERSION, INORGANIC FINE PARTICLE-DISPERSED SLURRY COMPOSITION AND METHOD FOR PRODUCING INORGANIC FINE PARTICLE-DISPERSED SHEET

TECHNICAL FIELD

The present invention relates to a vehicle composition for inorganic fine particle dispersion which has excellent decomposability at low temperature and enables degreasing in a short time, an inorganic fine particle-dispersed slurry composition containing the vehicle composition for inorganic fine particle dispersion, and a method for producing an inorganic fine particle-dispersed sheet with the inorganic fine particle-dispersed slurry composition.

BACKGROUND ART

Compositions containing inorganic fine particles such as ceramic powder or glass particles dispersed in a binder resin have been used in production of laminated electronic components such as multilayer ceramic capacitors.

Such multilayer ceramic capacitors are commonly produced by the following method. First, additives such as a plasticizer and a dispersant are added to a solution of a binder resin in an organic solvent. Ceramic raw material powder is then added, and the materials are uniformly mixed with a ball mill or the like to give an inorganic fine particle-dispersed composition.

The obtained inorganic fine particle-dispersed composition is casted on a surface of a support such as a release-treated polyethylene terephthalate film or a SUS plate using a doctor blade, a reverse roll coater, or the like. The organic solvent and other volatile components are evaporated, and then the composition is separated from the support to give a ceramic green sheet.

Next, a conductive paste to form an internal electrode is applied to the obtained ceramic green sheet by screen printing or the like. Sheets obtained in this manner are stacked and pressure-bonded with heat to prepare a laminate. The obtained laminate is heated to perform what is called "degreasing", a treatment to remove components such as the binder resin by thermal decomposition. The laminate is then fired to give a ceramic fired body including internal electrodes. External electrodes are then applied to the end surfaces of the obtained ceramic fired body, followed by firing. A multilayer ceramic capacitor is thus completed.

In many cases, a binder resin may serve as a cause of blistering or cracking of the fired body in firing and thus degreasing is preferably performed at low temperature in a short time. In such a situation, use of a binder resin which enables firing at low temperature and leaves a smaller amount of residual carbon components after firing has been studied.

For example, Patent Literature 1 examines use of paraffin wax and polyethylene glycol so as to make the degreasing temperature relatively as low as from 230° C. to 350° C. Patent Literature 2 examines use as a binder resin an acrylic resin having an average molecular weight of $2.0 \times 10^5$ or more, an acid value of 2.4 to 7.2, and a glass transition temperature of 50° C. to 90° C. so as to improve the removability of the binder resin.

CITATION LIST

Patent Literature

Patent Literature 1: JP 6187810 B
Patent Literature 2: JP 2007-073977 A

SUMMARY OF INVENTION

Technical Problem

However, in Patent Literature 1, the binder resin itself unfortunately has insufficient strength for production of thin ceramic green sheets. Further, although the method disclosed in Patent Literature 2 enables degreasing at low temperature, the degreasing time is very long. In addition, when the method is applied to a large ceramic molded article, there is still room for improvement in terms of degreasing inside the article.

In view of the above state, the present invention aims to provide a vehicle composition for inorganic fine particle dispersion which has excellent decomposability at low temperature and enables degreasing in a short time, an inorganic fine particle-dispersed slurry composition containing the vehicle composition for inorganic fine particle dispersion, and a method for producing an inorganic fine particle-dispersed sheet with the inorganic fine particle-dispersed slurry composition.

Solution to Problem

The present invention relates to a vehicle composition for inorganic fine particle dispersion containing a binder resin, an organic solvent, and an organic compound having a boiling point at normal pressure of 200° C. or higher and lower than 400° C., the binder resin containing a (meth)acrylic resin, the organic compound containing at least one selected from a phenol compound, an aromatic amine compound, a quinone compound, and a nitro compound, the amount of the organic compound being 1 to 100 parts by weight relative to 100 parts by weight of the binder resin.

The present invention is described in detail below.

The present inventors found out that prolonged degreasing of a (meth)acrylic resin is caused by proceeding of thermal decomposition of the (meth)acrylic resin by the following mechanism. In other words, in thermal decomposition of a (meth)acrylic resin, a depolymerization reaction occurs when the firing environment temperature reaches the ceiling temperature of the (meth)acrylic resin or higher. In this reaction, part of monomers generated by decomposition are further oxidized and burnt by heat so that they are decomposed into components with a smaller molecular weight. At this time, most of the decomposed monomers are repolymerized into a polymer by firing heat. In this mechanism, many of thermally decomposed polymer components are again polymerized and thus the apparent decomposing speed for the (meth)acrylic resin decomposition is low. This serves as a cause of prolonged degreasing.

The present inventors then made intensive studies and found out that adding a specific organic compound to a (meth)acrylic resin can increase the apparent decomposing speed and enables degreasing at low temperature in a short time. The present inventors also found out that use of an inorganic fine particle-dispersed slurry composition containing a vehicle composition for inorganic fine particle dispersion which contains such a specific organic compound for production of a ceramic green sheet can effectively prevent blistering or breaking of the sheet which occurs during removal of the binder resin. They thus completed the present invention.

The vehicle composition for inorganic fine particle dispersion, which is an aspect of the present invention, contains a binder resin that contains a (meth)acrylic resin.

The (meth)acrylic resin is not limited and preferably contains a segment derived from a (meth)acrylate containing an ester substituent having a carbon number of 8 or less.

The phrase "an ester substituent having a carbon number of 8 or less" means that the sum of the carbon numbers excluding the carbon atoms constituting the (meth)acryloyl group in the (meth)acrylate is 8 or less. The (meth)acrylate containing an ester substituent having a carbon number of 8 or less herein encompasses those other than the (meth) acrylates containing a glycidyl group to be described later.

Examples of the (meth)acrylate containing an ester substituent having a carbon number of 8 or less include (meth) acrylates containing a linear, branched, or cyclic alkyl group.

Examples of the (meth)acrylates containing a linear alkyl group include methyl (meth)acrylate, ethyl (meth)acrylate, propyl (meth)acrylate, and n-butyl (meth) acrylate.

Examples of the (meth)acrylates containing a branched alkyl group include alkyl (meth)acrylates such as tert-butyl (meth)acrylate, isobutyl (meth)acrylate, 2-ethylhexyl (meth) acrylate, and benzyl (meth)acrylate.

An example of the (meth)acrylates containing a cyclic alkyl group is cyclohexyl (meth)acrylate.

Examples of the (meth)acrylate containing an ester substituent having a carbon number of 8 or less used also include (meth)acrylates containing a hydroxy or carboxyl group such as 2-hydroxyethyl (meth)acrylate, hydroxypropyl (meth)acrylate, hydroxybutyl (meth)acrylate, and (meth) acrylic acid.

In particular, in order to allow rapid degreasing at low temperature, the (meth)acrylic resin preferably contains a segment derived from a (meth)acrylate containing a linear alkyl group or a (meth)acrylate containing a branched alkyl group, more preferably contains a segment derived from methyl methacrylate, n-butyl methacrylate, isobutyl methacrylate, or 2-ethylhexyl methacrylate. The (meth)acrylate containing an ester substituent having a carbon number of 8 or less is preferably a combination of (meth)acrylate containing a linear alkyl group and (meth)acrylate containing a branched alkyl group.

The (meth)acrylate containing an ester substituent having a carbon number of 8 or less used may be a (meth)acrylate containing an ester substituent having a carbon number of 1 to 4 or may be a (meth)acrylate containing an ester substituent having a carbon number of 5 to 8. From the viewpoint of decomposability at low temperature, particularly preferably used is a combination of a (meth)acrylate containing an ester substituent having a carbon number of 1 to 4 and a (meth)acrylate containing an ester substituent having a carbon number of 5 to 8.

The lower limit of the amount of the segment derived from a (meth)acrylate containing an ester substituent having a carbon number of 8 or less in the (meth)acrylic resin is preferably 40% by weight, more preferably 50% by weight, still more preferably 55% by weight, further more preferably 60% by weight, and the upper limit thereof is preferably 100% by weight, more preferably 95% by weight, from the viewpoint of decomposability at low temperature.

When the amount is not lower than the preferred lower limit and not higher than the preferred upper limit, the binder resin can have improved decomposability at low temperature and the resulting ceramic green sheet can have excellent toughness.

The lower limit of the amount of the segment derived from a (meth)acrylate containing an ester substituent having a carbon number of 1 to 4 in the (meth)acrylic resin is preferably 30% by weight, more preferably 35% by weight, and the upper limit thereof is preferably 100% by weight, more preferably 95% by weight, still more preferably 90% by weight, further more preferably 84% by weight, particularly preferably 82% by weight, from the viewpoint of decomposability at low temperature.

In a preferred embodiment of the present invention, the lower limit of the amount of the segment derived from a (meth)acrylate containing an ester substituent having a carbon number of 1 or 2 in the (meth)acrylic resin is preferably 20% by weight, more preferably 30% by weight, and the upper limit thereof is preferably 70% by weight, more preferably 60% by weight, from the viewpoint of decomposability at low temperature.

In a preferred embodiment of the present invention, the lower limit of the amount of the segment derived from a (meth)acrylate containing an ester substituent having a carbon number of 3 or 4 in the (meth)acrylic resin is preferably 0% by weight, more preferably 15% by weight, and the upper limit thereof is preferably 80% by weight, more preferably 70% by weight, from the viewpoint of decomposability at low temperature.

The lower limit of the amount of the segment derived from the (meth)acrylate containing an ester substituent having a carbon number of 5 to 8 in the (meth)acrylic resin is preferably 0% by weight, more preferably 5% by weight, still more preferably 15% by weight, further more preferably 18% by weight, and the upper limit thereof is preferably 70% by weight, more preferably 65% by weight, still more preferably 60% by weight, from the viewpoint of decomposability at low temperature.

The lower limit of the amount of the segment derived from isobutyl methacrylate in the (meth)acrylic resin is preferably 30% by weight, more preferably 40% by weight, and the upper limit thereof is preferably 60% by weight, more preferably 50% by weight, from the viewpoint of decomposability at low temperature.

The (meth)acrylic resin may contain a segment derived from a (meth)acrylate containing an ester substituent having a carbon number of 9 or more.

The presence of the segment derived from a (meth) acrylate containing an ester substituent having a carbon number of 9 or more can sufficiently lower the decomposition ending temperature of the (meth)acrylic resin, and allows the resulting inorganic fine particle-dispersed sheet to be tough.

In the (meth)acrylate containing an ester substituent having a carbon number of 9 or more, the ester substituent preferably has a branched chain structure from the viewpoint of decomposability at low temperature.

The upper limit of the carbon number of the ester substituent is preferably 30, more preferably 20, still more preferably 10.

Examples of the (meth)acrylate containing an ester substituent having a carbon number of 9 or more include (meth)acrylates containing a linear or branched alkyl group having a carbon number of 9 or more and polyalkylene glycol (meth)acrylates.

Examples of the (meth)acrylate containing a linear or branched alkyl group include n-nonyl (meth)acrylate, isononyl (meth)acrylate, n-decyl (meth)acrylate, isodecyl (meth)acrylate, n-lauryl (meth)acrylate, isolauryl (meth)acrylate, n-stearyl (meth)acrylate, and isostearyl (meth)acrylate.

Preferred among them are (meth)acrylates containing a branched alkyl group having a carbon number of 9 or more. More preferred are isononyl (meth)acrylate, isodecyl (meth)acrylate, and isostearyl (meth)acrylate.

Isodecyl methacrylate has particularly excellent decomposability compared with other long-chain alkyl methacrylates.

Examples of the polyalkylene glycol (meth)acrylate include those having a unit such as an ethylene glycol unit (oxyethylene unit), a propylene glycol unit (oxypropylene unit), or a butylene glycol unit (oxybutylene unit).

The polyalkylene glycol (meth)acrylate may have an alkoxy group at an end or may have an ethylhexyl group at an end.

Examples of the alkoxy group include methoxy, ethoxy, and butoxy groups. The alkoxy group may be linear or branched, and is preferably branched.

The polyalkylene glycol (meth)acrylate preferably has a branched alkylene glycol structure.

In particular, a polyalkylene glycol (meth)acrylate containing at least one of an ethylene glycol unit, a propylene glycol unit, or a butylene glycol unit is preferred. More preferred are polyethylene glycol methacrylate, ethoxypolypropylene glycol methacrylate, methoxypolypropylene glycol methacrylate, polybutylene glycol methacrylate, and polypropylene glycol-polybutylene glycol methacrylate.

Methoxypolypropylene glycol methacrylate, polypropylene glycol methacrylate, polybutylene glycol methacrylate, and polypropylene glycol-polybutylene glycol methacrylate leave less firing residues and have particularly excellent decomposability at low temperature compared with other alkylene glycol (meth)acrylates.

The lower limit of the amount of the segment derived from a (meth)acrylate containing an ester substituent having a carbon number of 9 or more in the (meth)acrylic resin is preferably 5% by weight, more preferably 10% by weight, and the upper limit thereof is preferably 40% by weight, more preferably 30% by weight, from the viewpoint of decomposability at low temperature.

The (meth)acrylic resin contains a segment derived from a glycidyl group-containing (meth)acrylate.

The presence of the segment derived from a glycidyl group-containing (meth)acrylate allows the resulting laminate to have sufficiently improved strength.

Examples of the glycidyl group-containing (meth)acrylate include glycidyl (meth)acrylate, 4-hydroxybutyl (meth)acrylate glycidyl ether, and 3,4-epoxycyclohexylmethyl (meth) acrylate.

The lower limit of the amount of the segment derived from a glycidyl group-containing (meth)acrylate in the (meth)acrylic resin is 1% by weight and the upper limit thereof is 10% by weight.

When the amount of the segment derived from a glycidyl group-containing (meth)acrylate is 1% by weight or more, the resulting inorganic fine particle-dispersed sheet can have improved solvent resistance. When the amount of the segment derived from a glycidyl group-containing (meth)acrylate is 10% by weight or less, the (meth)acrylic resin can have sufficiently improved decomposability at low temperature.

The lower limit of the amount of the segment derived from a glycidyl group-containing (meth)acrylate is preferably 2% by weight and the upper limit thereof is preferably 7% by weight.

The amount of the (meth)acrylic resin in the vehicle composition for inorganic fine particle dispersion, which is an aspect of the present invention, is not limited. The lower limit thereof is preferably 5% by weight and the upper limit thereof is preferably 80% by weight.

When the amount of the (meth)acrylic resin is within the above range, the resulting inorganic fine particle-dispersed slurry composition can be degreased even by firing at low temperature.

The lower limit of the amount of the (meth)acrylic resin is more preferably 6% by weight, more preferably 15% by weight, still more preferably 30% by weight and the upper limit thereof is more preferably 78% by weight.

The lower limit of the weight average molecular weight in terms of polystyrene of the (meth)acrylic resin is preferably 100,000 and the upper limit thereof is preferably 3,000,000. When the weight average molecular weight is 100,000 or more, the vehicle composition for inorganic fine particle dispersion can have sufficient viscosity. When the weight average molecular weight is 3,000,000 or less, the printability can be improved.

The lower limit of the weight average molecular weight is more preferably 200,000 and the upper limit thereof is more preferably 1,500,000.

In particular, when the weight average molecular weight in terms of polystyrene of the (meth)acrylic resin is 200,000 to 1,500,000, sufficient viscosity can be ensured with a small amount of resin by the use of an organic solvent to be described later and an inorganic fine particle-dispersed slurry with less stringiness can be obtained.

The ratio (Mw/Mn) of the weight average molecular weight (Mw) to the number average molecular weight (Mn) is preferably 2 or higher and 8 or lower.

When the Mw/Mn is within this range, a component having a low degree of polymerization can be contained in an appropriate amount. The viscosity of the vehicle composition for inorganic fine particle dispersion thus can fall within a suitable range, so that the productivity can be enhanced. In addition, the resulting inorganic fine particle-dispersed sheet can have appropriate sheet strength.

When the Mw/Mn is lower than 2, the leveling during application of the green sheet is poor, so that the green sheet may have poor smoothness. When the Mw/Mn is higher than 8, a large amount of a high-molecular-weight component is present. The green sheet thus may be poorly dried and may have poor surface smoothness.

The Mw/Mn is more preferably 3 or higher and 8 or lower.

The weight average molecular weight and the number average molecular weight in terms of polystyrene can be measured by GPC analysis using, for example, a column LF-804 (available from Showa Denko K.K.).

The (meth)acrylic resin preferably has a glass transition temperature (Tg) of 30° C. or higher and lower than 60° C.

When the glass transition temperature is within the range, the amount of a plasticizer to be added can be reduced, so that the (meth)acrylic resin can have improved decomposability at low temperature.

The Tg can be measured with, for example, a differential scanning calorimeter (DSC).

The lower limit of the glass transition temperature is more preferably 35° C., still more preferably 40° C. The upper limit thereof is more preferably 60° C.

The upper limit of the time needed for 90% by weight decomposition of the (meth)acrylic resin in heating at 5° C./min from 30° C. (hereinafter, also referred to as the "90% by weight decomposition time") is preferably 50 minutes.

This can lead to significantly high decomposability at low temperature and thus can reduce the time needed for degreasing.

The 90% by weight decomposition time can be measured by, for example, TGDTA.

The (meth)acrylic resin of the present invention may be produced by any method. In an exemplary method, a raw material monomer mixture containing a (meth)acrylate and the like is mixed with an organic solvent and the like to prepare a monomer mixture. A polymerization initiator is added to the obtained monomer mixture, and the raw material monomers are copolymerized.

Any polymerization method may be used. Examples thereof include emulsion polymerization, suspension polymerization, bulk polymerization, interfacial polymerization, and solution polymerization. In particular, solution polymerization is preferred.

Examples of the polymerization initiator include P-menthane hydroperoxide, diisopropylbenzene hydroperoxide, 1,1,3,3-tetramethylbutyl hydroperoxide, cumene hydroxyperoxide, t-butyl hydroxyperoxide, cyclohexanone peroxide, and disuccinic acid peroxide.

Commercially available examples thereof include PERMENTA H, PERCUMYL P, PEROCTA H, PERCUMYL H-80, PERBUTYL H-69, PERHEXA H, and PEROYL SA (all available from NOF Corporation).

The vehicle composition for inorganic fine particle dispersion, which is an aspect of the present invention, contains an organic solvent.

The organic solvent is not limited and is preferably excellent in coating properties, drying properties, inorganic powder dispersibility, and the like during production of the inorganic fine particle-dispersed sheet. For example, more preferably, the boiling point is lower than 200° C. Examples of the organic solvent include alcohols, ketones, acetates, carboxylates, aromatic hydrocarbons, and terpenes. In a preferred embodiment of the present invention, more preferred organic solvents are alcohols, acetates, carboxylates, and terpenes.

Specific examples thereof include ethanol, toluene, ethyl acetate, butyl acetate, isopropanol, methyl isobutyl ketone, methyl ethyl ketone, methyl isobutyl ketone, ethylene glycol ethyl ether, ethylene glycol monobutyl ether, ethylene glycol monoethyl ether acetate, diethylene glycol monoethyl ether, diethylene glycol monomethyl ether, diethylene glycol monoisobutyl ether, trimethylpentanediol monoisobutyrate, butyl carbitol, butyl carbitol acetate, terpineol, terpineol acetate, dihydroterpineol, dihydroterpineol acetate, texanol, isophorone, butyl lactate, dioctyl phthalate, dioctyl adipate, benzyl alcohol, and phenyl propylene glycol. Preferred among them are ethanol, toluene, ethyl acetate, butyl acetate, methyl ethyl ketone, terpineol, terpineol acetate, dihydroterpineol, dihydroterpineol acetate, diethylene glycol monoethyl ether, diethylene glycol monomethyl ether, diethylene glycol monoisobutyl ether, butyl carbitol, butyl carbitol acetate, and texanol. More preferred are ethanol, toluene, ethyl acetate, butyl acetate, methyl ethyl ketone, terpineol, terpineol acetate, dihydroterpineol, dihydroterpineol acetate, and texanol. These organic solvents may be used alone or in combination of two or more.

The amount of the organic solvent in the vehicle composition for inorganic fine particle dispersion, which is an aspect of the present invention, is not limited. The lower limit thereof is preferably 10% by weight and the upper limit thereof is preferably 80% by weight, more preferably 60% by weight, still more preferably 50% by weight, further more preferably 40% by weight. When the amount is within the above range, the coating properties and the inorganic fine particle dispersibility can be improved.

The vehicle composition for inorganic fine particle dispersion, which is an aspect of the present invention, contains an organic compound having a boiling point at normal pressure of 200° C. or higher, preferably 210° C. or higher, more preferably 220° C. or higher, still more preferably 230° C. or higher, further more preferably 240° C. or higher, particularly preferably 250° C. or higher, and lower than 400° C., preferably 380° C. or lower, more preferably 350° C. or lower, still more preferably 330° C. or lower, particularly preferably 300° C. or lower.

The organic compound contains at least one selected from the group consisting of a phenol compound, an aromatic amine compound, a quinone compound, and a nitro compound.

The presence of the organic compound can prevent repolymerization of monomer gas during degreasing of the binder resin and enables rapid degreasing. The organic compound is a compound different from the organic solvent. The organic compound is preferably in the form of solid at room temperature and normal pressure.

Examples of the phenol compound include alkylphenols, alkoxyphenols, formylphenols, hydroxyphenols, acetyl phenols, and nitrophenols.

Examples of the alkylphenols include methylphenols such as 3-methylphenol (m-cresol, boiling point: 203° C.), 2-isopropyl-6-methylphenol (boiling point: 225° C.), 4-isopropyl-3-methylphenol (boiling point: 246° C.), 4-isopropyl-2-methylphenol (boiling point: 236° C.), 2-methoxy-4-methylphenol (boiling point: 221° C.), 2-iodo-4-methylphenol (boiling point: 241° C.), 2,4,6-tribromo-3-methylphenol (boiling point: 304° C.), 2,3,5,6-tetramethylphenol (boiling point: 247° C.), pentamethylphenol (boiling point: 248° C.), 4-methylphenol (p-cresol, boiling point: 202° C.), 2,6-di-tert-butyl-4-methylphenol (2,6-di-tert-butyl-p-cresol, boiling point: 265° C.), 2,3-dimethylphenol (2,3-xylenol, boiling point: 217° C.), 2,4-dimethylphenol (2,4-xylenol, boiling point: 211° C.), 2,5-dimethylphenol (2,5-xylenol, boiling point: 212° C.), 2,6-dimethylphenol (2,6-xylenol, boiling point: 203° C.), 3,4-dimethylphenol (3,4-xylenol, boiling point: 227° C.), 3,5-dimethylphenol (3,5-xylenol, boiling point: 222° C.), and 6-tert-butyl-2,4-dimethylphenol (6-tert-butyl-2,4-xylenol, boiling point: 249° C.); 2-octylphenol (boiling point: 305° C.), 4-octylphenol (boiling point: 276° C.), 2,6-di-tert-butylphenol (boiling point: 253° C.), 6-isopropyl-3-methylphenol (boiling point: 232° C.), 2-isopropyl-3-methylphenol (boiling point: 228° C.), 3-isopropyl-5-methylphenol (boiling point: 241° C.), 2,6-dibromo-4-methylphenol, 2,6-di-tert-butyl-4-methoxyphenol, 4-ethylphenol (boiling point: 218° C.), 2-hydroxy-3-methylbenzenesulfonic acid, 4-hydroxy-3-methylbenzenesulfonic acid, dodecylphenol (boiling point: 310° C.), 2,3,5-trimethylphenol (boiling point: 230° C.), 2,3,6-trimethylphenol (boiling point: 215° C.), nonylphenol (boiling point: 293° C.), 4-tert-butylphenol (boiling point: 236° C.), stearyl 3-(3,5-di-tert-butyl-4-hydroxyphenyl) propionate, 2,4-bis(octylthiomethyl)-6-methylphenol, 2,2'-methylenebis[6-(1-methylcyclohexyl)-p-cresol], 2,6-di-tert-butyl-4-ethylphenol (boiling point: 272° C.), DL-α-tocopherol, and D-α-tocopherol.

Examples of the alkoxyphenols include 2-methoxyphenol (guaiacol, boiling point: 205° C.), 4-methoxyphenol (4-hydroxyanisole, boiling point: 243° C.), 4-(benzyloxy)phenol (monobenzone, boiling point: 298° C.), 2-tert-butyl-4-methoxyphenol (3-tert-butyl-4-hydroxyanisole, boiling point: 264° C.), 2-methoxy-4-ethylphenol (boiling point:

235° C.), trans-ferulic acid (boiling point: 250° C.), 3-methoxy-4-hydroxybenzeneacrylic acid (boiling point: 250° C.), t-butyl hydroxyanisole (boiling point: 264° C.), isoeugenol (boiling point: 266° C.), ethyl vanillin (boiling point: 285° C.), and eugenol (boiling point: 254° C.).

Examples of the formylphenols include 4-formylphenol (4-hydroxybenzaldehyde, boiling point: 310° C.), 3-formylphenol (3-hydroxybenzaldehyde, boiling point: 240° C.), 2-formyl-4-methoxyphenol (2-hydroxy-5-methoxybenzaldehyde, boiling point: 250° C.), 2-formyl-5-methoxyphenol (2-hydroxy-4-methoxybenzaldehyde), 4-formyl-2-methoxyphenol (vanillin, boiling point: 285° C.), 3-formyl-6-methoxyphenol (isovanillin), 2-formyl-6-methoxyphenol (ortho-vanillin, boiling point: 265° C.), and 4-hydroxyisophthalaldehyde (2,4-diformylphenol).

Examples of the hydroxyphenols include benzenediols such as 2-hydroxyphenol (catechol, boiling point: 245° C.), 4-hydroxyphenol (hydroquinone, boiling point: 285° C.), 2-tert-butyl-4-hydroxyphenol (2-tert-butylhydroquinone, boiling point: 295° C.), 4-tert-butyl-2-hydroxyphenol (4-tert-butylpyrocatechol, boiling point: 285° C.), resorcinol (boiling point: 281° C.), 4,4'-(2,3-dimethyltetramethylene) dipyrocatechol (boiling point: 363° C.), 1,4-dihydroxynaphthalene (boiling point: 246° C.), 2,5-di-tert-amylhydroquinone (boiling point: 353° C.), 2,5-di-vert-butylhydroquinone (boiling point: 321° C.), trimethylhydroquinone (boiling point: 295° C.), and methylhydroquinone (boiling point: 285° C.); and benzenetriols such as benzene-1,2,3-triol (pyrogallol, boiling point: 309° C.), pyrogallol-4-carboxylic acid (2,3,4-trihydroxybenzoic acid, boiling point: 259° C.), propyl gallate (propyl 3,4,5-trihydroxybenzoate, boiling point: 312° C.), 1,3,5-trihydroxybenzene, 2,3,4-trihydroxybenzophenone, dodecyl gallate (boiling point: 394° C.), and flopropione (boiling point: 275° C.).

Examples of the acetyl phenols include 4-acetylphenol (4-hydroxyacetophenone) and 2-acetylphenol (2-hydroxyacetophenone, boiling point: 218° C.)

Examples of the nitrophenols include nitrophenol compounds such as 2-nitrophenol (boiling point: 216° C.), 3-nitrophenol (boiling point: 252° C.), 4-nitrophenol (boiling point: 279° C.), 5-fluoro-2-nitrophenol (boiling point: 260° C.), 2,6-dimethyl-4-nitrophenol (boiling point: 285° C.), 2-methoxy-4-nitrophenol (boiling point: 298° C.), 5-methyl-2-nitrophenol (boiling point: 266° C.), and 2-chloro-4-nitrophenols; dinitrophenol compounds such as 2,3-dinitrophenol (boiling point: 329° C.), 3,5-dinitrophenol (boiling point: 318° C.), 3,4-dinitrophenol (boiling point: 318° C.), 5-methyl-2,4-dinitrophenol (boiling point: 335° C.), 2-methyl-3,5-dinitrophenol (boiling point: 335° C.), 4-methyl-3,5-dinitrophenol (boiling point: 335° C.), 2,4-dinitrophenol (boiling point: 318° C.), 2,4-dinitro-6-methylphenol, and 2,6-dinitro-4-methylphenol (boiling point: 335° C.); and trinitrophenol compounds such as 2,4,6-trinitrophenol (boiling point: 300° C.)

Examples of phenol compounds other than the alkylphenols, alkoxyphenols, formylphenols, hydroxyphenols, acetylphenols, and nitrophenols include 2-(4-hydroxyphenyl) ethanol, 3-hydroxy-2-naphthoic acid (boiling point: 283° C.), methyl 4-hydroxybenzoate (boiling point: 299° C.), n-heptyl 4-hydroxybenzoate (boiling point: 338° C.), isoamyl salicylate (boiling point: 277° C.), methyl salicylate (boiling point: 222° C.), isobutyl 4-hydroxybenzoate, isopropyl 4-hydroxybenzoate, ethyl 4-hydroxybenzoate (boiling point: 297° C.), butyl 4-hydroxybenzoate, propyl 4-hydroxybenzoate, 4-hydroxybenzoic acid (boiling point: 213° C.), 6-hydroxy-2-naphthoic acid (boiling point: 283° C.), 4-chlorophenol (boiling point: 220° C.), 4-hydroxyphenylacetic acid (boiling point: 234° C.), bis(4-hydroxyphenyl) sulfone (boiling point: 363° C.), p-phenolsulfonic acid hydrate (boiling point: 275° C.), 1-naphthol (boiling point: 278° C.), 2-naphthol (boiling point: 285° C.), 4-methoxy-1-naphthol (boiling point: 265° C.), (R)-(+)-1,1'-bi-2-naphthol (boiling point: 388° C.), (S)-(−)-1,1'-bi-2-naphthol (boiling point: 388° C.), 2,2-bis(4-hydroxyphenyl)propane, 4-cyano-4'-hydroxybiphenyl (boiling point: 332° C.), 4-(4-hydroxyphenyl)benzoic acid (boiling point: 314° C.), 4,4'-biphenol (boiling point: 280° C.), 2-phenylphenol (boiling point: 282° C.), 4-phenylphenol (boiling point: 321° C.), 5-hydroxy-1-tetralone (boiling point: 228° C.), 4-phenoxyphenol, 4,4'-(dimethylmethylene)bis[2-(2-propenyl)phenol], 4-(2-methoxyethyl)phenol, 2,2-bis(4-hydroxyphenyl) hexafluoropropane (boiling point: 400° C.), styrenated phenol (boiling point: 250° C.), 1,1-bis(4-hydroxyphenyl) cyclohexane (boiling point: 371° C.), benzyl salicylate, salicylamide (boiling point: 270° C.), arbutin (boiling point: 375° C.), and 4-iodophenol.

Examples of the aromatic amine compound include aniline derivatives.

Examples of the aniline derivatives include 2,3-dimethylaniline (2,3-xylidine, boiling point: 221° C.), 2,4-dimethylaniline (2,4-xylidine, boiling point: 218° C.), 2,5-dimethylaniline (2,5-xylidine, boiling point: 218° C.), 2,6-dimethylaniline (2,6-xylidine, boiling point: 216° C.), 3,4-dimethylaniline (3,4-xylidine, boiling point: 226° C.), 3,5-dimethylaniline (3,5-xylidine, boiling point: 221° C.), o-acetoacetanisidide (boiling point: 346° C.), acetanilide (boiling point: 304° C.), acetoacetanilide, 2',4'-dimethylacetoacetanilide (boiling point: 344° C.), 2'-chloroacetoacetanilide (boiling point: 303° C.), N-(2,5-dimethoxyphenyl) (acetyl)acetamide, 4'-chloro-2',5'-dimethoxyacetoacetanilide, N-acetoacetyl-o-toluidine (boiling point: 327° C.), N-acetoacetyl-p-toluidine, o-anisidine (boiling point: 225° C.), p-anisidine (boiling point: 246° C.), 4'-aminoacetanilide (boiling point: 267° C.), 4-aminobenzoic acid (boiling point: 252° C.), ethyl 4-aminobenzoate, 2-aminobenzenethiol, 2-aminophenol, 3-aminophenol, 4-aminophenol (boiling point: 284° C.), 4-aminobenzonitrile, anthranilic acid (boiling point: 252° C.), 3-isopropoxyaniline (boiling point: 230° C.), N-ethylaniline (boiling point: 205° C.), 5-amino-2-chlorotoluene-4-sulfonic acid, 6-amino-1-naphthol-3-sulfonic acid hydrate, 3,5-diaminobenzoic acid (boiling point: 275° C.), 3,4'-diaminodiphenyl ether (boiling point: 207° C.), 4,4'-diaminodiphenyl ether, 2,2'-dimethylbiphenyl-4,4'-diamine, N,N-diethylaniline (boiling point: 217° C.), diphenylamine (boiling point: 302° C.), N,N'-diphenylformamidine (boiling point: 323° C.), 4,4'-diamino-3,3'-dimethyldiphenylmethane (boiling point: 358° C.), N,N-dimethyl-p-toluidine (boiling point: 211° C.), sulfanilic acid, 2-amino-1-naphthalenesulfonic acid (boiling point: 220° C.), 2,4,5-trichloroaniline (boiling point: 270° C.), o-toluidine (boiling point: 200° C.), m-toluidine (boiling point: 203° C.), p-toluidine (boiling point: 200° C.), 2,4-diaminotoluene (boiling point: 283° C.), bis(4-aminophenyl)sulfone, 1,4-phenylenediamine (boiling point: 267° C.), 4-methoxy-2-methyldiphenylamine, N,N-diethyl-3-methylbenzene-1,4-diamine, amidol, 1-phenyl-1H-benzimidazole-2-thiol, 1-phenyl-5-mercapto-1H-tetrazole (boiling point: 342° C.), 2-chloroaniline (boiling point: 208° C.), 2,5-dichioroaniline (boiling point: 251° C.), 4-chloroanthranilic acid (boiling point: 250° C.), 2-chloro-4-nitroaniline (boiling point: 320° C.), 5-chloro-2-nitroaniline (boiling point: 200° C.), 3-(4-chlorophenyl)-1,1-dimethylurea (boiling point: 301° C.), 4,4'-methylenebis(2- chloroaniline), 2,4-difluoroaniline, 1,3-di-o-tolylguanidine (boiling point: 371° C.), 1-(o-tolyl)biguanide (boiling point: 316° C.), 1,3-diphenyl-2-thiourea, N-phenyl-1-naphthylamine, styrenated diphenylamine, N,N'-diphenyl-1,4-phenylenediamine, N-(1,3-dimethylbutyl)-N'-phenyl-1,4-phenylenediamine (boiling point: 260° C.), 2-hydroxy-3-(4-anillinoanillino)propyl methacrylate, N,N'-di-2-naphthyl-1,4-phenylenediamine (boiling point: 232° C.), mercaptobenzimidazole, methyl-2-mercaptobenzimidazole, methyl anthranilate (boiling point: 256° C.), methyl N-methylanthranilate (boiling point: 256° C.), sulfadimethoxine (boiling point: 265° C.), mefenamic acid (boiling point: 384° C.), 6-amino-4-hydroxy-2-naphthalenesulfonic acid, 4'-hydroxyacetanilide (boiling point: 273° C.), 7-anillino-4-hydroxy-2-naphthalenesulfonic acid, 4-(methylamino)phenol sulfate, N-(4-hydroxyphenyl)glycine (boiling point: 295° C.), and 4-methyl-2-nitroaniline.

Examples of the quinone compound include benzoquinones, including 1,4-benzoquinone (p-quinone, boiling point: 293° C.), alkylbenzoquinones such as 2,6-dimethyl-1,4-benzoquinone (2,6-dimethyl-p-quinone, boiling point: 201° C.), phenylbenzoquinones such as 2,5-diphenyl-1,4-benzoquinone (2,5-diphenyl-p-quinone), and halogenated benzoquinones such as 2,5-dichloro-1,4-benzoquinone (2,5-dichloro-p-quinone, boiling point: 251° C.), 2,6-dichloro-1,4-benzoquinone (2,6-dichloro-p-quinone, boiling point: 251° C.), tetrabromo-1,4-benzoquinone (tetrabromo-p-quinone, boiling point: 201° C.), and 2,3-dichloro-5,6-dicyano-1,4-benzoquinone; anthraquinones such as anthraquinone (9,10-anthraquinone, boiling point: 380° C.) and 2-pentyl-9,10-anthracenedione (2-pentylanthraquinone); naphthacenequinones such as 5,12-naphthacenequinone (boiling point: 361° C.); and naphthoquinones such as 1,4-naphthoquinone (boiling point: 243° C.), 2-hydroxy-1,4-naphthoquinone (boiling point: 265° C.), and 2,3-dichloro-1,4-naphthoquinone.

Examples of the nitro compound include nitrobenzenes, including nitrobenzenes such as 4-nitrobenzoic acid (boiling point: 237° C.), ammonium p-nitrobenzoate dihydrate, 4-nitrobenzoyl chloride, 2-fluoronitrobenzene, 4-fluoronitrobenzene (boiling point: 205° C.), nitrobenzene (boiling point: 210° C.), 5-nitroguaiacol sodium, and 2-methyl-6-nitrobenzoic acid anhydride, dinitrobenzenes such as 1,2-dinitrobenzene (boiling point: 319° C.), 1,3-dinitrobenzene (boiling point: 297° C.), 1,4-dinitrobenzene (p-dinitrobenzene, boiling point: 299° C.), and tetramethyl-p-dinitrobenzene (dinitrodurene, boiling point: 365° C.), and trinitrobenzenes such as 1,3,5-trinitrobenzene (boiling point: 315° C.); and nitrotoluenes, including nitrotoluenes such as 2-nitrotoluene (boiling point: 225° C.) and 4-nitrotoluene (boiling point: 238° C.), dinitrotoluenes such as 2,4-dinitrotoluene (boiling point: 300° C.), and trinitrotoluenes such as 1,3,5-trinitrotoluene (boiling point: 240° C.)

The nitro compound as used herein means a compound other than the phenol compound, the aromatic amine compound, or the quinone compound.

From the viewpoint of improving the decomposing speed of the (meth)acrylic resin, preferred among them are phenol compounds and quinone compounds, more preferred are alkylphenols, alkoxyphenols, hydroxyphenols, formylphenols, nitrophenols, benzoquinones, and anthraquinones, still more preferred are 2,6-di-tert-butyl-p-cresol, 4-methoxyphenol, 4-tert-butylpyrocatechol, hydroquinone, 4-hydroxybenzaldehyde, anthraquinone, 2-nitrophenol, 2,5-dichloro-1,4-benzoquinone, 2-tert-butyl-4-hydroxyphenol, 4-tert-butylphenol, and trimethylhydroquinone.

The lower limit of the amount of the organic compound in the vehicle composition for inorganic fine particle dispersion, which is an aspect of the present invention, is 1 part by weight and the upper limit thereof is 100 parts by weight relative to 100 parts by weight of the binder resin.

When the amount of the organic compound is 1 part by weight or more, the thermal decomposition promoting effect can be sufficiently exerted. When the amount of the organic compound is 100 parts by weight or less, no organic compound can remain in the ceramic green sheet and thus blistering or breaking caused by residues can be prevented.

From the viewpoint of thermal decomposition promoting effect, the lower limit of the amount of the organic compound is preferably 2 parts by weight, more preferably 5 parts by weight. From the viewpoint of preventing blistering or breaking caused by residues, the upper limit thereof is preferably 80 parts by weight, more preferably 60 parts by weight, still more preferably 40 parts by weight, further more preferably 20 parts by weight, particularly preferably 10 parts by weight.

The vehicle composition for inorganic fine particle dispersion, which is an aspect of the present invention, may be produced by any method, and may be produced by a conventionally known stirring method. Specifically, in an exemplary method, the (meth)acrylic resin, the organic solvent, the organic compound, and optionally other components are stirred with a triple roll mill or the like.

An inorganic fine particle-dispersed slurry composition can be produced by adding inorganic fine particles, a plasticizer, and optionally other components to the vehicle composition for inorganic fine particle dispersion, which is an aspect of the present invention.

The present invention also encompasses such an inorganic fine particle-dispersed slurry composition.

The inorganic fine particle-dispersed slurry composition, which is another aspect of the present invention, contains inorganic fine particles.

Any inorganic fine particles may be used. Examples thereof include glass powder, ceramic powder, phosphor fine particles, silicon oxide, and metal fine particles.

Any glass powder may be used. Examples thereof include powders of glass such as bismuth oxide glass, silicate glass, lead glass, zinc glass, or boron glass, and various silicon oxide glass powders such as $CaO$—$Al_2O_3$—$SiO_2$ glass powder, $MgO$—$Al_2O_3$—$SiO_2$ glass powder, and $LiO_2$—$Al_2O_3$—$SiO_2$ glass powder.

Usable glass powders also include $SnO$—$B_2O_3$—$P_2O_5$—$Al_2O_3$ mixtures, $PbO$—$B_2O_3$—$SiO_2$ mixtures, $BaO$—$ZnO$—$B_2O_3$—$SiO_2$ mixtures, $ZnO$—$Bi_2O_3$—$B_2O_3$—$SiO_2$ mixtures, $Bi_2O_3$—$B_2O_3$—$BaO$—$CuO$ mixtures, $Bi_2O_3$—$ZnO$—$B_2O_3$—$Al_2O_3$—$SrO$ mixtures, $ZnO$—$Bi_2O_3$—$5_2O_3$ mixtures, $Bi_2O_3$—$SiO_2$ mixtures, $P_2O_5$—$Na_2O$—$CaO$—$BaO$—$Al_2O_3$—$B_2O_3$ mixtures, $P_2O_5$—$SnO$ mixtures, $P_2O_5$—$SnO$—$B_2O_3$ mixtures, $2_2O_5$—$SnO$—$SiO_2$ mixtures, $CuO$—$P_2O_5$—$RO$ mixtures, $SiO_2$—$B_2O_3$—$ZnO$—$Na_2O$—$Li_2O$—$NaF$—$V_2O_5$ mixtures, $P_2O_5$—$ZnO$—$SnO$—$R_2O$—$RO$ mixtures, $B_2O_3$—$SiO_2$—$ZnO$ mixtures, $B_2O_3$—$SiO_2$—$Al_2O_3$—$ZrO_2$ mixtures, $SiO_2$—$B_2O_3$—$ZnO$—$R_2O$—$RO$ mixtures, $SiO_2$—$B_2O_3$—$Al_2O_3$—$RO$—$R_2O$ mixtures, $SrO$—$ZnO$—$P_2O_5$ mixtures, $SrO$—$ZnO$—$P_2O_5$ mixtures, and $BaO$—$ZnO$—$B_2O_3$—$S1O_2$ mixtures. R is an element selected from the group consisting of Zn, Ba, Ca, Mg, Sr, Sn, Ni, Fe, and Mn.

Particularly preferred are $PbO$—$B_2O_3$—$SiO_2$ mixture glass powders and lead-free glass powders such as $BaO$—$ZnO$—$B_2O_3$—$SiO_2$ mixtures or $ZnO$—$B1_2O_3$—$B_2O_3$—$SiO_2$ mixtures.

Any ceramic powder may be used. Examples thereof include alumina, ferrite, zirconia, zircon, barium zirconate, calcium zirconate, titanium oxide, barium titanate, strontium titanate, calcium titanate, magnesium titanate, zinc titanate, lanthanum titanate, neodymium titanate, lead zirconate titanate, alumina nitride, silicon nitride, boron nitride, boron carbide, barium stannate, calcium stannate, magnesium silicate, mullite, steatite, cordierite, and forsterite.

Usable ceramic powders also include ITO, FTO, niobium oxide, vanadium oxide, tungsten oxide, lanthanum strontium manganite, lanthanum strontium cobalt ferrite, yttrium-stabilized zirconia, gadolinium-doped ceria, nickel oxide, and lanthanum chromite.

Any phosphor fine particles may be used. For example, the phosphor may be a blue phosphor, a red phosphor, or a green phosphor conventionally known as a phosphor for displays. Examples of the blue phosphor include $MgAl_{10}O_{17}$:Eu phosphors, $Y_2SiO_5$: Ce phosphors, $CaWO_4$:Pb phosphors, $BaMgAl_{14}O_{23}$:Eu phosphors, $BaMgAl_{16}O_{27}$:Eu phosphors, $BaMg_2Al_{14}O_{23}$:Eu phosphors, $BaMg_2Al_{14}O_{27}$:Eu phosphors, and ZnS:(Ag,Cd) phosphors. Examples of the red phosphor include $Y_2O_3$:Eu phosphors, $Y_2SiO_5$:Eu phosphors, $Y_3Al_5O_{12}$:Eu phosphors, $Zn_3(PO_4)_2$:Mn phosphors, $YBO_3$:Eu phosphors, (Y,Gd)$BO_3$:Eu phosphors, $GdBO_3$:Eu phosphors, $ScBO_3$:Eu phosphors, and $LuBO_3$:Eu phosphors. Examples of the green phosphor include $Zn_2SiO_4$:Mn phosphors, $BaAl_{12}O_{19}$:Mn phosphors, $SrAl_{13}O_{19}$:Mn phosphors, $CaAl_{12}O_{19}$:Mn phosphors, $YBO_3$:Tb phosphors, $BaMgAl_{14}O_{23}$:Mn phosphors, $LuBO_3$:Tb phosphors, $GdBO_3$:Tb phosphors, $ScBO_3$:Tb phosphors, and $Sr_6Si_3O_3Cl_4$:Eu phosphors. Other usable phosphors include ZnO:Zn phosphors, ZnS:(Cu,Al) phosphors, ZnS:Ag phosphors, $Y_2O_2S$:Eu phosphors, ZnS:Zn phosphors, (Y,Cd)$BO_3$:Eu phosphors, and $BaMgAl_{12}O_{23}$:Eu phosphors.

Any metal fine particles may be used. Examples thereof include powders of copper, nickel, palladium, platinum, gold, silver, aluminum, and tungsten, and alloys thereof.

Metals such as copper and iron have good adsorption properties with a carboxy group, an amino group, an amide group, and the like, and are easily oxidized. Such metals can also be suitably used. These metal powders may be used alone or in combination of two or more.

A metal complex, any of various carbon blacks and carbon nanotubes, or the like may also be used.

The inorganic fine particles to be used in the present invention preferably contain lithium or titanium because inorganic compounds having a perovskite structure have a Curie temperature of around 300° C. Specific examples include low-melting glass such as $LiO_2.Al_2O_3.SiO_2$ inorganic glass, lithium sulfur glass such as $Li_2S$—$M_xS_y$ (M=B, Si, Ge, or P), lithium cobalt complex oxides such as $LiCoO_2$, lithium manganese complex oxides such as $LiMnO_4$, lithium nickel complex oxides, lithium vanadium complex oxides, lithium zirconium complex oxides, lithium hafnium complex oxides, lithium silicophosphate ($Li_{3.5}Si_{0.5}P_{0.5}O_4$), titanium lithium phosphate ($LiTi_2(PO_4)_3$), lithium titanate ($Li_4Ti_5O_{12}$), $Li_{4/3}Ti_{5/3}O_4$, $LiCoO_2$, germanium lithium phosphate ($LiGe_2(PO_4)_3$), $Li_2$—SiS glass, $Li_4GeS_4$—$Li_3PS_4$ glass, $LiSi_3$, $LiMn_2O_4$, $Li_2S$—$P_2S_5$ glass/ceramics, $Li_2O$—$SiO_2$, $Li_2O$—$V_2O_5$—$SiO_2$, $LiS$-$SiS_2$-$Li_4SiO_4$ glass, ion conductive oxides such as LiPON, lithium oxide compounds such as $Li_2O$-$P_2O_5$—$B_2O_3$ and $Li_2O$—$GeO_2Ba$, $LiAl_yTi_z(PO_4)_3$ glass, $La_xLi_yTiO_z$ glass, $Li_xGe_yP_zO_4$ glass, $Li_7La_3Zr_2O_{12}$ glass, $Li_vSi_wP_xS_yCl_z$ glass, lithium niobium oxides such as $LiNbO_3$, lithium alumina compounds such as Li-β-alumina, and lithium zinc oxides such as $Li_{14}Zn(GeO_4)_4$.

The amount of the inorganic fine particles in the inorganic fine particle-dispersed slurry composition, which is another aspect of the present invention, is not limited. The lower limit thereof is preferably 10% by weight, more preferably 20% by weight, and the upper limit thereof is preferably 90% by weight, more preferably 60% by weight, still more preferably 50% by weight, further more preferably 45% by weight. When the amount is not less than the lower limit, the inorganic fine particle-dispersed slurry composition can have sufficient viscosity and excellent coating properties. When the amount is not more than the upper limit, the inorganic fine particle-dispersed slurry composition can have excellent inorganic fine particle dispersibility.

The inorganic fine particle-dispersed slurry composition, which is another aspect of the present invention, contains a plasticizer.

Examples of the plasticizer include di(butoxyethyl) adipate, dibutoxyethoxyethyl adipate, triethylene glycol bis(2-ethylhexanoate), triethylene glycol dihexanoate, tributyl acetylcitrate, and dibutyl sebacate.

Use of any of these plasticizers can reduce the amount of the plasticizer added compared with the case of using a conventional plasticizer (the amount relative to the binder can be reduced from about 30% by weight to 25% by weight or less, or further to 20% by weight or less).

In particular, a non-aromatic plasticizer is preferably used. The plasticizer more preferably contains a component derived from adipic acid, triethylene glycol, or citric acid. Plasticizers containing an aromatic ring are not preferred because they easily produce soot when burnt.

The plasticizer preferably contains an alkyl group having a carbon number of 4 or more.

The plasticizer containing an alkyl group having a carbon number of 4 or more can suppress absorption of moisture into the plasticizer, and thus can prevent trouble such as voids and swelling in the resulting inorganic fine particle-dispersed sheet. In particular, the alkyl group of the plasticizer is preferably positioned at a molecular end.

The plasticizer preferably has a carbon:oxygen ratio of 5:1 to 3:1.

When the carbon:oxygen ratio is within the above range, the plasticizer can have improved combustibility and prevent production of residual carbon. In addition, the plasticizer can have improved compatibility with the (meth) acrylic resin and exhibit a plasticizing effect even when used in a small amount.

Even a high-boiling-point organic solvent having a propylene glycol skeleton or a trimethylene glycol skeleton can be suitably used as long as it contains an alkyl group having a carbon number of 4 or more and a carbon:oxygen ratio of 5:1 to 3:1.

The plasticizer preferably has a boiling point of 240° C. or higher and lower than 390° C. When the boiling point is 240° C. or higher, the plasticizer is easily evaporated in a drying step, so that remaining of the plasticizer in the molded article can be prevented. When the boiling point is lower than 390° C., production of residual carbon can be prevented. The boiling point means a boiling point at normal pressure.

The amount of the plasticizer in the inorganic fine particle-dispersed slurry composition, which is another aspect of the present invention, is not limited. The lower limit thereof is preferably 0.1% by weight, more preferably 0.5% by weight, still more preferably 1% by weight, and the upper limit thereof is preferably 3.0% by weight, more preferably 2.5% by weight, still more preferably 2% by weight. When the amount is within this range, firing residues of the plasticizer can be reduced.

The inorganic fine particle-dispersed slurry composition, which is another aspect of the present invention, may contain an additive such as a surfactant.

Any surfactant may be used. Examples thereof include cationic surfactants, anionic surfactants, and nonionic surfactants.

The nonionic surfactant may be any nonionic surfactant, but is preferably a nonionic surfactant having a HLB value of 10 or more and 20 or less. The "HLB value" herein is used as an index of the hydrophilicity and the lipophilicity of the surfactant. Several calculation methods have been proposed. In an exemplary method, the HLB value for ester surfactants is defined by $20(1-S/A)$, where S is the saponification value and A is the acid value of fatty acid constituting the surfactant. Specific suitable examples of the surfactant include nonionic surfactants containing polyethylene oxide in which an alkylene ether is added to an aliphatic chain. Specific suitable examples thereof include polyoxyethylene lauryl ether and polyoxyethylene cetyl ether. Here, although the nonionic surfactant has good thermal decomposability, adding it in a large amount may reduce the thermal decomposability of the inorganic fine particle-dispersed slurry composition. The upper limit of the amount of the surfactant is thus preferably 5% by weight.

The amount of the binder resin (particularly (meth)acrylic resin) in the inorganic fine particle-dispersed slurry composition, which is another aspect of the present invention, is not limited. The lower limit thereof is preferably 1% by weight, more preferably 3% by weight, still more preferably 5% by weight, and the upper limit thereof is preferably 30% by weight, more preferably 20% by weight, still more preferably 10% by weight. When the amount is within the above range, the resulting inorganic fine particle-dispersed slurry composition can be degreased even by firing at low temperature.

In the inorganic fine particle-dispersed slurry composition, the lower limit of the amount of the organic compound is preferably 0.01% by weight, more preferably 0.05% by weight, and the upper limit thereof is preferably 20% by weight, more preferably 10% by weight. When the amount of the organic compound is not less than the lower limit, the thermal decomposition promoting effect can be sufficiently exerted. When the amount of the organic compound is not more than the upper limit, no organic compound can remain in the ceramic green sheet and thus blistering or breaking caused by residues can be prevented.

The amount of the organic solvent in the inorganic fine particle-dispersed slurry composition is not limited. The lower limit thereof is preferably 40% by weight, more preferably 45% by weight, still more preferably 50% by weight, and the upper limit thereof is preferably 80% by weight, more preferably 70% by weight, still more preferably 65% by weight. When the amount of the organic solvent is within the above range, the coating properties and the inorganic fine particle dispersibility can be improved.

The inorganic fine particle-dispersed slurry composition, which is another aspect of the present invention, may have any viscosity. The lower limit of the viscosity measured at 20° C. using a B-type viscometer at a probe rotation frequency of 5 rpm is preferably 0.1 Pa·s and the upper limit thereof is preferably 100 Pa·s.

When the viscosity is 0.1 Pa·s or higher, after the inorganic fine particle-dispersed slurry composition is applied by a die-coating printing method or the like, the resulting inorganic fine particle-dispersed sheet can maintain a predetermined shape. When the viscosity is 100 Pa·s or lower, trouble such as remaining of die discharge marks can be prevented, and excellent printability can be obtained.

The inorganic fine particle-dispersed slurry composition, which is another aspect of the present invention, may be produced by any method, and may be produced by a conventionally known stirring method. Specifically, in an exemplary method, the (meth)acrylic resin, the plasticizer, the inorganic fine particles, the organic solvent, and optionally other components are stirred with a triple roll mill or the like.

An inorganic fine particle-dispersed sheet can be produced by applying the inorganic fine particle-dispersed slurry composition, which is another aspect of the present invention, to a support film whose one surface is release-treated, and drying the organic solvent to shape the composition into a sheet form. The present invention also encompasses such a method for producing an inorganic fine particle-dispersed sheet.

The inorganic fine particle-dispersed sheet, which is another aspect of the present invention, preferably has a thickness of 1 to 20 μm.

The inorganic fine particle-dispersed sheet may be produced by, for example, a method including applying the inorganic fine particle-dispersed slurry composition to a support film with a coating system such as a roll coater, a die coater, a squeeze coater, or a curtain coater to uniformly form a coating film on the support film.

When the inorganic fine particle-dispersed sheet is produced, the polymerization solution is preferably used as-is as the inorganic fine particle-dispersed slurry composition and processed into the inorganic fine particle-dispersed sheet without drying the (meth)acrylic resin.

This is because drying the (meth)acrylic resin results in occurrence of undried particles when the (meth)acrylic resin is again formed into a solution. Such particles are difficult to be removed even by filtration using a cartridge filter and adversely affect the strength of the inorganic fine particle-dispersed sheet.

The support film used in production of the inorganic fine particle-dispersed sheet is preferably a resin film having flexibility as well as heat resistance and solvent resistance. When the support film has flexibility, the inorganic fine particle-dispersed slurry composition can be applied to a surface of the support film with a roll coater, a blade coater, or the like, and the resulting film with the formed inorganic fine particle-dispersed sheet can be stored and supplied in the form of a wound roll.

Examples of the resin forming the support film include polyethylene terephthalate, polyester, polyethylene, polypropylene, polystyrene, polyimide, polyvinyl alcohol, polyvinyl chloride, fluororesin such as polyfluoroethylene, nylon, and cellulose.

The support film preferably has a thickness of, for example, 20 to 100 μm.

A surface of the support film is preferably release-treated. Such a treatment allows easy separation of the support film in a transcribing step.

An all-solid-state battery can be produced by using the inorganic fine particle-dispersed slurry composition and the inorganic fine particle-dispersed sheet as materials of a positive electrode, a solid electrolyte, and a negative electrode of the all-solid-state battery. A multilayer ceramic capacitor can be produced by using the inorganic fine particle-dispersed slurry composition and the inorganic fine particle-dispersed sheet for dielectric green sheets and an electrode paste.

Advantageous Effects of Invention

The present invention can provide a vehicle composition for inorganic fine particle dispersion which has excellent decomposability at low temperature and enables degreasing in a short time, an inorganic fine particle-dispersed slurry composition containing the vehicle composition for inorganic fine particle dispersion, and a method for producing an inorganic fine particle-dispersed sheet with the inorganic fine particle-dispersed slurry composition.

DESCRIPTION OF EMBODIMENTS

The present invention is more specifically described in the following with reference to, but not limited to, examples.

Example 1

(1) Preparation of Resin Composition

A 2-L separable flask equipped with a stirrer, a condenser, a thermometer, a water bath, and a nitrogen gas inlet was provided. The 2-L separable flask was charged with 35 parts by weight of methyl methacrylate (MMA, carbon number of ester substituent: 1), 5 parts by weight of glycidyl methacrylate (GMA), and 60 parts by weight of 2-ethylhexyl methacrylate (2EHMA, carbon number of ester substituent: 8). Then, the components were mixed with 40 parts by weight of butyl acetate as an organic solvent to give a monomer mixture.

The obtained monomer mixture was bubbled with nitrogen gas for 20 minutes to remove dissolved oxygen. Thereafter, the separable flask system was purged with nitrogen gas, and the temperature was raised with stirring until the water bath came to a boil. Thereto was added 0.5 parts by weight of PEROYL SA as a polymerization initiator. Further, 0.5 parts by weight of PEROYL SA was added three hours after the start of the polymerization.

Seven hours after the start of the polymerization, the contents of the flask were cooled to room temperature to complete the polymerization. Thus, a resin composition containing a (meth)acrylic resin was obtained.

(2) Preparation of Vehicle Composition for Inorganic Fine Particle Dispersion

To the obtained resin composition was added the organic compound shown in Table 1 in a proportion shown in Table 1 relative to 100 parts by weight of the (meth)acrylic resin. The components were mixed with a ball mill to give a vehicle composition for inorganic fine particle dispersion.

(3) Preparation of Inorganic Fine Particle-Dispersed Slurry Composition

To the obtained vehicle composition for inorganic fine particle dispersion were added barium titanate ("BT-02", available from Sakai Chemical Industry Co. Ltd., average particle size: 0.2 μm) as inorganic fine particles, di(butoxyethyl) adipate as a plasticizer, and butyl acetate as an organic solvent in amounts shown in Table 1. The components were mixed with a ball mill to give an inorganic fine particle-dispersed slurry composition.

(4) Preparation of Inorganic Fine Particle-Dispersed Sheet

The obtained inorganic fine particle-dispersed slurry composition was applied to a release-treated polyester film such that the dry thickness was 20 μm. The applied composition was dried at room temperature for one hour and using a hot-air dryer at 80° C. for three hours, then at 120° C. for two hours, whereby an inorganic fine particle-dispersed sheet was formed on the support film.

(5) Preparation of Sintered Body

The obtained inorganic fine particle-dispersed sheet was peeled off the support film, maintained on an alumina substrate in an electric furnace set to 280° C. for one hour, and then fired in an electric furnace set to 1100° C. for five hours to give a sintered body.

Examples 2 to 15 and Comparative Examples 1 to 8

A resin composition, a vehicle composition for inorganic fine particle dispersion, an inorganic fine particle-dispersed slurry composition, an inorganic fine particle-dispersed sheet, and a sintered body were prepared as in Example 1, except that in "(1) Preparation of resin composition", monomers were mixed in amounts shown in Table 1, an organic compound shown in Table 1 was used, and the formulation was as shown in Table 1.

The following monomers were used.
EMA: n-ethyl methacrylate, carbon number of ester substituent: 2
BMA: n-butyl methacrylate, carbon number of ester substituent: 4
iBMA: isobutyl methacrylate, carbon number of ester substituent: 4
iDMA: isodecyl methacrylate, carbon number of ester substituent: 10
SMA: stearyl methacrylate, carbon number of ester substituent: 18
iSMA: isostearyl methacrylate, carbon number of ester substituent: 18

Comparative Example 9

A resin composition, a vehicle composition for inorganic fine particle dispersion, an inorganic fine particle-dispersed slurry composition, an inorganic fine particle-dispersed sheet, and a sintered body were prepared as in Example 1, except that polyethylene oxide resin: PEO-1 (available from Sumitomo Seika Chemicals Co. Ltd., number average molecular weight: 50,000) was used as a binder resin and the formulation was as shown in Table 1.

Comparative Example 10

A resin composition, a vehicle composition for inorganic fine particle dispersion, an inorganic fine particle-dispersed slurry composition, an inorganic fine particle-dispersed sheet, and a sintered body were prepared as in Example 1, except that polyvinyl acetate resin (available from FUJIFILM Wako Pure Chemical Corp., weight average molecular weight: 50,000) was used as a binder resin, an organic compound shown in Table 1 was used, and the formulation was as shown in Table 1.

TABLE 1

| | Vehicle composition for inorganic fine particle dispersion ||||||||||||||
| | Binder resin ||||||||||||||
| | (Meth)acrylic resin |||||||||| Polyethylene oxide resin || Polyvinyl acetate resin ||
| | Proportion (wt %) ||||||||| Amount (parts by weight) | Proportion (wt %) | Amount (parts by weight) | Proportion (wt %) | Amount (parts by weight) |
| | MMA | EMA | BMA | IBMA | 2EHMA | IDMA | SMA | ISMA | GMA | | PEO-1 | | Polyvinyl acetate | |
|---|---|---|---|---|---|---|---|---|---|---|---|---|---|---|
| Example 1 | 35 | — | — | — | 60 | — | — | — | 5 | 100 | — | 0 | — | 0 |
| Example 2 | 35 | — | — | — | 60 | — | — | — | 5 | 100 | — | 0 | — | 0 |
| Example 3 | 30 | — | 50 | — | 20 | — | — | — | — | 100 | — | 0 | — | 0 |
| Example 4 | 30 | — | 50 | — | 20 | — | — | — | — | 100 | — | 0 | — | 0 |
| Example 5 | 30 | — | 50 | — | 20 | — | — | — | — | 100 | — | 0 | — | 0 |
| Example 6 | 30 | — | 50 | — | 20 | — | — | — | — | 100 | — | 0 | — | 0 |
| Example 7 | 30 | — | 50 | — | 20 | — | — | — | — | 100 | — | 0 | — | 0 |
| Example 8 | 30 | — | — | 50 | 20 | — | — | — | — | 100 | — | 0 | — | 0 |
| Example 9 | 30 | — | — | 50 | 20 | — | — | — | — | 100 | — | 0 | — | 0 |
| Example 10 | — | 30 | 10 | 60 | — | — | — | — | — | 100 | — | 0 | — | 0 |
| Example 11 | — | 30 | 30 | 40 | — | — | — | — | — | 100 | — | 0 | — | 0 |
| Example 12 | — | 30 | — | 60 | 10 | — | — | — | — | 100 | — | 0 | — | 0 |
| Example 13 | — | 55 | — | 40 | 5 | — | — | — | — | 100 | — | 0 | — | 0 |
| Example 14 | — | 30 | — | 50 | — | — | — | 20 | — | 100 | — | 0 | — | 0 |
| Example 15 | — | 50 | — | 40 | — | 10 | — | — | — | 100 | — | 0 | — | 0 |
| Comparative Example 1 | 35 | — | — | — | 60 | — | — | — | 5 | 100 | — | 0 | — | 0 |
| Comparative Example 2 | 30 | 5 | — | 50 | 10 | — | 5 | — | — | 100 | — | 0 | — | 0 |
| Comparative Example 3 | 35 | — | — | — | 60 | — | — | — | — | 100 | — | 0 | — | 0 |
| Comparative Example 4 | 30 | — | 50 | — | 20 | — | — | — | — | 100 | — | 0 | — | 0 |
| Comparative Example 5 | 30 | — | 50 | — | 20 | — | — | — | — | 100 | — | 0 | — | 0 |
| Comparative Example 6 | 30 | — | 50 | — | 20 | — | — | — | — | 100 | — | 0 | — | 0 |
| Comparative Example 7 | 30 | — | 50 | — | 20 | — | — | — | — | 100 | — | 0 | — | 0 |
| Comparative Example 8 | — | 55 | — | 40 | 5 | — | — | — | — | 100 | — | 0 | — | 0 |
| Comparative Example 9 | — | — | — | — | — | — | — | — | — | 0 | 100 | 100 | — | 0 |
| Comparative Example 10 | — | — | — | — | — | — | — | — | — | 0 | — | 0 | 100 | 100 |

TABLE 1-continued

| | Vehicle composition for inorganic fine particle dispersion | | | | | | | Inorganic fine particle-dispersed slurry composition (wt %) | | | | |
|---|---|---|---|---|---|---|---|---|---|---|---|---|
| | Organic solvent | | Polymerization initiator | | Organic compound | | | Binder resin | Organic compound | Plasticizer | Organic solvent | Inorganic fine particles |
| | Type | Amount (parts by weight) | Type | Amount (parts by weight) | Type | Boiling point (°C.) | Amount (parts by weight) | | | | | |
| Example 1 | Butyl acetate | 40 | PEROYL SA | 1 | 4-Tert-butylpyrocatechol | 285 | 10 | 6 | 0.6 | 1.2 | 62.2 | 30 |
| Example 2 | Butyl acetate | 40 | PEROYL SA | 1 | 2,6-Di-tert-butyl-p-cresol | 265 | 10 | 6 | 0.6 | 1.2 | 62.2 | 30 |
| Example 3 | Butyl acetate | 40 | PEROYL SA | 1 | Hydroquinone | 282 | 1 | 6 | 0.06 | 1.2 | 62.74 | 30 |
| Example 4 | Butyl acetate | 40 | PEROYL SA | 1 | Hydroquinone | 282 | 10 | 6 | 0.6 | 1.2 | 62.2 | 30 |
| Example 5 | Butyl acetate | 40 | PEROYL SA | 1 | 4-Methoxyphenol | 243 | 1 | 6 | 0.06 | 1.2 | 62.74 | 30 |
| Example 6 | Butyl acetate | 40 | PEROYL SA | 1 | 2-Nitrophenol | 216 | 1 | 6 | 0.06 | 1.2 | 62.74 | 30 |
| Example 7 | Butyl acetate | 40 | PEROYL SA | 1 | 2,5-Dichloro-1,4-benzoquinone | 251 | 1 | 6 | 0.06 | 1.2 | 62.74 | 30 |
| Example 8 | Butyl acetate | 40 | PEROYL SA | 1 | 4-Hydroxybenzaldehyde | 310 | 100 | 6 | 6 | 1.2 | 56.8 | 30 |
| Example 9 | Butyl acetate | 40 | PEROYL SA | 1 | Anthraquinone | 380 | 100 | 6 | 6 | 1.2 | 56.8 | 30 |
| Example 10 | Ethanol | 40 | PEROYL SA | 1 | 2-Tert-butyl-4-hydroxyphenol | 295 | 5 | 6 | 0.3 | 1.2 | 62.5 | 30 |
| Example 11 | Ethanol | 40 | PEROYL SA | 1 | 4-Tert-butylphenol | 236 | 4 | 6 | 0.24 | 1.2 | 62.56 | 30 |
| Example 12 | Toluene | 40 | PEROYL SA | 1 | Trimethylhydroquinone | 295 | 3 | 6 | 0.18 | 1.2 | 62.62 | 30 |
| Example 13 | Toluene | 40 | PEROYL SA | 1 | 4-Methoxyphenol | 243 | 2 | 6 | 0.12 | 1.2 | 62.68 | 30 |
| Example 14 | Toluene | 40 | PEROYL SA | 1 | Trimethylhydroquinone | 295 | 3 | 6 | 0.18 | 1.2 | 62.62 | 30 |
| Example 15 | Butyl acetate | 40 | PEROYL SA | 1 | 4-Methoxyphenol | 243 | 2 | 6 | 0.12 | 1.2 | 62.68 | 30 |
| Comparative Example 1 | Butyl acetate | 40 | PEROYL SA | 1 | Hydroquinone | 282 | 0.5 | 6 | 0.03 | 1.2 | 62.77 | 30 |
| Comparative Example 2 | Butyl acetate | 40 | PEROYL SA | 1 | Phenol | 182 | 10 | 6 | 0.6 | 1.2 | 62.2 | 30 |
| Comparative Example 3 | Butyl acetate | 40 | PEROYL SA | 1 | 2-Ethylphenol | 195 | 10 | 6 | 0.6 | 1.2 | 62.2 | 30 |
| Comparative Example 4 | Butyl acetate | 40 | PEROYL SA | 1 | 4-Tert-butylpyrocatechol | 285 | 120 | 6 | 7.2 | 1.2 | 55.6 | 30 |
| Comparative Example 5 | Butyl acetate | 40 | PEROYL SA | 1 | 1,2-Dihydroxyanthraquinone | 430 | 100 | 6 | 6 | 1.2 | 56.8 | 30 |
| Comparative Example 6 | Butyl acetate | 40 | PEROYL SA | 1 | Hydroquinone | 282 | 0.5 | 6 | 0.03 | 1.2 | 62.77 | 30 |
| Comparative Example 7 | Butyl acetate | 40 | PEROYL SA | 1 | Hydroquinone | 282 | 120 | 6 | 7.2 | 1.2 | 55.6 | 30 |
| Comparative Example 8 | Butyl acetate | 40 | PEROYL SA | 1 | Benzoic acid | 249 | 100 | 6 | 6 | 1.2 | 56.8 | 30 |
| Comparative Example 9 | Butyl acetate | 40 | — | 0 | Hydroquinone | 282 | 1 | 6 | 0.06 | 1.2 | 62.74 | 30 |
| Comparative Example 10 | Butyl acetate | 40 | — | 0 | Hydroquinone | 282 | 100 | 6 | 6 | 1.2 | 56.8 | 30 |

<Evaluation>

The following evaluations were performed on the (meth) acrylic resins, polyethylene oxide resins, polyvinyl acetate resins, inorganic fine particle-dispersed slurry compositions, inorganic fine particle-dispersed sheets, and sintered bodies obtained in the examples and comparative examples. Table 2 shows the results.

(1) Measurement of Average Molecular Weight

The weight average molecular weight (Mw) in terms of polystyrene of each of the obtained (meth)acrylic resin, polyethylene oxide resin, and polyvinyl acetate resin was measured by gel permeation chromatography using a column LF-804 (available from Shoko Science Co., Ltd.).

(2) Measurement of Glass Transition Temperature

The glass transition temperature (Tg) of each of the obtained (meth)acrylic resin, polyethylene oxide resin, and polyvinyl acetate resin was measured using a differential scanning calorimeter (DSC).

(3) TGDTA Characteristics

The obtained inorganic fine particle-dispersed slurry composition was put in an alumina pan of a TG-DTA device, and heated at 5° C./min from 30° C. to evaporate the solvent and thermally decompose the resin and the plasticizer. Thereafter, the period of time until the indicated weight reached 30.6% by weight (90% by weight degreasing was finished) was measured, and taken as the decomposition ending time. The obtained decomposition ending time was evaluated according to the following criteria.

○ (Good): The decomposition ending time was 50 minutes or shorter.

x (Poor): The decomposition ending time was longer than 50 minutes.

(4) Sinterability

The appearance of the obtained sintered bodies was evaluated for 10 samples according to the following criteria.

○ (Good): Neither blistering nor cracking was observed for all 10 samples.

x (Poor): Blistering or cracking was observed for one or more samples.

(5) Residual Carbon

The presence or absence of coloring was visually checked for the obtained sintered bodies and the residual carbon was evaluated according to the following criteria.

○ (Good): The color of the sintered body was white or beige and coloring was hardly observed.

x (Poor): The color of the sintered body was brown or dark brown and significant coloring was observed.

TABLE 2

|  | Average molecular weight (Mw) | Resin Tg (° C.) | TGDTA Decomposition ending time (min) | Evaluation | Sinterability Number of Poor samples (pcs) | Evaluation | Residual carbon Color | Evaluation |
|---|---|---|---|---|---|---|---|---|
| Example 1 | 200,000 | 33 | 50 | ○ | 0 | ○ | White | ○ |
| Example 2 | 200,000 | 33 | 50 | ○ | 0 | ○ | White | ○ |
| Example 3 | 400,000 | 40 | 50 | ○ | 0 | ○ | Beige | ○ |
| Example 4 | 400,000 | 40 | 50 | ○ | 0 | ○ | Beige | ○ |
| Example 5 | 400,000 | 40 | 50 | ○ | 0 | ○ | Beige | ○ |
| Example 6 | 400,000 | 40 | 50 | ○ | 0 | ○ | Beige | ○ |
| Example 7 | 400,000 | 40 | 50 | ○ | 0 | ○ | Beige | ○ |
| Example 8 | 1,000,000 | 56 | 48 | ○ | 0 | ○ | White | ○ |
| Example 9 | 1,000,000 | 56 | 48 | ○ | 0 | ○ | White | ○ |
| Example 10 | 1,000,000 | 55 | 48 | ○ | 0 | ○ | White | ○ |
| Example 11 | 1,000,000 | 48 | 48 | ○ | 0 | ○ | White | ○ |
| Example 12 | 1,000,000 | 52 | 48 | ○ | 0 | ○ | White | ○ |
| Example 13 | 1,000,000 | 57 | 48 | ○ | 0 | ○ | White | ○ |
| Example 14 | 1,000,000 | 48 | 48 | ○ | 0 | ○ | White | ○ |
| Example 15 | 1,000,000 | 52 | 48 | ○ | 0 | ○ | White | ○ |
| Comparative Example 1 | 500,000 | 22 | 74 | x | 3 | x | Brown | x |
| Comparative Example 2 | 500,000 | 66 | 74 | x | 4 | x | Brown | x |
| Comparative Example 3 | 500,000 | 22 | 74 | x | 6 | x | Brown | x |
| Comparative Example 4 | 400,000 | 40 | 54 | x | 1 | x | Yellow | x |
| Comparative Example 5 | 400,000 | 40 | 94 | x | 10 | x | Black | x |
| Comparative Example 6 | 400,000 | 40 | 74 | x | 4 | x | Brown | x |
| Comparative Example 7 | 400,000 | 40 | 94 | x | 8 | x | Black | x |
| Comparative Example 8 | 1,000,000 | 57 | 74 | x | 4 | x | Brown | x |
| Comparative Example 9 | 150,000 | −10 | 100 | x | 18 | x | Black | x |
| Comparative Example 10 | 50,000 | 33 | 105 | x | 18 | x | Black | x |

In Examples 1 to 15, excellent characteristics were observed in all evaluations. In contrast, with the compositions of Comparative Examples 1 to 10, firing did not sufficiently proceed at 280° C. and the fired bodies suffered blistering or cracking.

INDUSTRIAL APPLICABILITY

The present invention can provide a vehicle composition for inorganic fine particle dispersion which has excellent decomposability at low temperature and enables degreasing in a short time, an inorganic fine particle-dispersed slurry composition containing the vehicle composition for inorganic fine particle dispersion, and a method for producing an inorganic fine particle-dispersed sheet with the inorganic fine particle-dispersed slurry composition.

The invention claimed is:

1. A vehicle composition for inorganic fine particle dispersion, comprising a binder resin, an organic solvent, and an organic compound having a boiling point at normal pressure of 200° C. or higher and lower than 400° C.,
the binder resin containing a (meth)acrylic resin,
the (meth)acrylic resin containing a segment derived from a (meth)acrylate containing an ester substituent having a carbon number of 1 to 4 which is a linear or branched alkyl group, and a segment derived from a (meth) acrylate containing an ester substituent having a carbon number of 5 to 8 which is a linear or branched alkyl group, the (meth)acrylic resin containing 30 to 95% by weight of the segment derived from the (meth)acrylate containing an ester substituent having a carbon number of 1 to 4, the (meth) acrylic resin having a weight average molecular weight in terms of polystyrene of 200,000 to 3,000,000, the organic compound containing at least one selected from the group consisting of a phenol compound, and a quinone compound, and the amount of the organic compound being 1 to 10 parts by weight relative to 100 parts by weight of the binder resin, wherein time required for 90% by weight decomposition of the (meth)acrylic resin during heating at 5° C./min from 30° C. is 50 minutes or less.

2. The vehicle composition for inorganic fine particle dispersion according to claim 1, wherein a content of a segment derived from isobutyl methacrylate as the (meth)acrylate containing an ester substituent having a carbon number of 1 to 4 based on a total content of the (meth)acrylic resin is 40% by weight to 95% by weight.

3. An inorganic fine particle-dispersed slurry composition comprising the vehicle composition for inorganic fine particle dispersion according to claim 1, inorganic fine particles, and a plasticizer.

4. A method for producing an inorganic fine particle-dispersed sheet, comprising using the inorganic fine particle-dispersed slurry composition according to claim 3.

5. An inorganic fine particle-dispersed slurry composition comprising the vehicle composition for inorganic fine particle dispersion according to claim 2, inorganic fine particles, and a plasticizer.

6. A method for producing an inorganic fine particle-dispersed sheet, comprising using the inorganic fine particle-dispersed slurry composition according to claim 5.

* * * * *